United States Patent [19]

Thibodeau

[11] Patent Number: 5,447,546
[45] Date of Patent: Sep. 5, 1995

[54] CARBURETOR AIR FILTER AND METHOD OF OPERATION OF SAME

[75] Inventor: Dennis Thibodeau, Windsor, Canada

[73] Assignee: Build-A-Mold Limited, Canada

[21] Appl. No.: 227,404

[22] Filed: Apr. 14, 1994

[51] Int. Cl.$^6$ .............................................. B01D 27/08
[52] U.S. Cl. .................................... 55/510; 261/23.2; 55/DIG. 28
[58] Field of Search ......... 261/23.2; 55/510, DIG. 28

[56] References Cited

U.S. PATENT DOCUMENTS

| | | | |
|---|---|---|---|
| 1,853,838 | 4/1932 | White | 55/DIG. 28 |
| 3,061,285 | 10/1962 | Garski et al. | 261/23.2 |
| 3,376,890 | 4/1968 | Hanson et al. | 55/510 |
| 3,619,990 | 11/1971 | Gayda | 55/510 |
| 3,698,371 | 10/1972 | Mitsuyama et al. | 261/23.2 |
| 3,710,560 | 1/1973 | Maddocks | 55/510 |
| 3,898,066 | 8/1975 | Miskiewicz | 55/510 |

*Primary Examiner*—Tim R. Miles
*Attorney, Agent, or Firm*—Howard & Howard

[57] ABSTRACT

An improved air filter has a plurality of tubular or cylindrical openings extending through a lower plate which are aligned with the venturis in a carburetor. The venturis in the carburetor draw in air through the filter. The openings in the air filter eliminate the turbulence or efficiency losses typically resulting from the use of an air filter. The openings are constructed to guide the air flow thus increasing the air volume through the carburetor. The inventive air filter configuration results in a seven to eight percent decrease in air flow over free air flow through the carburetor. Prior art air filters result in decreases on the order of twenty percent. In the use of carburetors for racing applications, the addition of approximately a twelve percent increase in air flow with the inventive air filter configuration provides enormous unexpected benefits. While it is necessary that the air be filtered on the way to a carburetor, it is also desirable to decrease the restriction in the air flow to the extent possible. The inventive air filter configuration eliminates the restriction to air flow reaching the carburetor, and provides valuable benefits which are particularly useful in racing applications.

17 Claims, 2 Drawing Sheets

CARBURETOR AIR FILTER AND METHOD OF OPERATION OF SAME

FIELD OF THE INVENTION
BACKGROUND OF THE INVENTION

This invention in general relates to an improved air filter structure for use with carburetors. The improved air filter reduces the restriction to air flow reaching the carburetor over prior art air filters.

It is known in the prior art to have venturi-type air intake ports in carburetors which draw fuel through discharge ports into the air flow. Such carburetors have found particular success in racing vehicles. One well-known type of such carburetors is the Holley ™ Carburetor.

In this basic type of carburetor, air is drawn into the carburetor through venturi ports. A central boost venturi surrounds a fuel discharge nozzle, which communicates with a fuel bowl in the carburetor. As air flows through the venturi, it draws fuel into that air flow through the discharge ports.

The central boost venturi is typically centered within the main air venturi. The boost venturi, as a venturi within a venturi, "sees" a lower absolute pressure (or higher vacuum) than the main venturi. To increase this effect, the fuel discharge in the boost venturi may be placed at the point of lowest pressure in the main venturi. This may be typically achieved by placing the boost venturi in a throat of the main venturi.

In designing the dimensions and contours of the main venturi, the boost venturi, and the fuel discharge force, several competing factors are considered. Engineering on the dimensions and contours of such carburetor is sufficiently advanced such that the dimensions and contours are typically optimized for each particular application.

As an example, a small venturi provides high velocities, strong metering signals, good atomization, vaporization, and mixing of the fuel and air. However, a large venturi is less restrictive to air flow, increasing air flow and the engine's power potential. At the same time, a larger venturi provides less effective atomization at low engine speeds.

The amount of air drawn into the engine through the carburetor has a direct effect on the available power from the engine. Typically, the amount of available air flow to the engine is always less than is desired. That is, it is always generally desired to increase the potential air flow. However, as explained above, due to various competing factors, one may not simply change the structure of the carburetor to increase the air flow.

At the same time, it is always necessary to filter the air leading to the engine and carburetor. In the absence of efficient filtering of impurities from the air, the engine will not be able to operate for any appreciable length of time.

In racing applications, it is particularly desirable to achieve maximum power, and thus supply as much air as possible to the carburetor. This goal, however, conflicts with filtering of the air. Prior art air filters typically restrict the air flow to the carburetor by as much as twenty percent over "free air flow." The term "free air flow" is used here to describe the amount of air that would flow through the carburetor in the absence of an air filter. Obviously, the restriction of twenty percent of the air flow leading to the carburetor is an undesirable result of the use of an air filter. At the same time, an air filter is a necessity.

While compromises that reduce potential air flow in the carburetor structure are inevitable, as explained above, the same compromise of reduced air flow due to the use of an air filter should be minimized to the extent possible. The prior art has been faced with the conflicting factors of the necessity of filtering the air, while at the same time desirably increasing air flow through the carburetor. The two goals have not both been satisfactorily met at this time.

SUMMARY OF THE INVENTION

In a disclosed embodiment of this invention, a plurality of tapered cylindrical openings are formed in a bottom plate of the air filter. These openings are each associated with one of the venturis in the carburetor. The openings in the air filter condition and increase the air flow to the carburetor. It has been found that with the inventive structure, the restriction of the air passing through the carburetor over the "free air flow" is only on the order of seven to eight percent. That is, about 12 percent better than prior art air filters. The prior art air filters typically have a single large central hole.

The openings provide a sort of nozzle effect and "guide" the flow into the venturi. Thus, air does not "swirl" entering the carburetor, but rather is guided smoothly along a desired path, maximizing the amount of total volume air flow through the carburetor. This is an important benefit.

As explained above, the inventive air filter improves the flow of air reaching the carburetor by as much as twelve to thirteen percent over the known air filters. The provision of that much additional air through the carburetor provides enormous benefits, particularly in racing applications. Now, air may be properly filtered leading to the carburetor such that the vehicle can continue to properly operate, but, at the same time, the restriction of air flow reaching the carburetor is on a level that exceeds free air flow.

In a disclosed embodiment of this invention, the lower plate has a number of downwardly extending tubes associated with each opening. Those tubes extend towards the venturi ports in the carburetor. In a most preferred embodiment of this invention, the tubes are generally tapered cylindrical, and extend to a location upstream from an uppermost end of the venturi ports. Thus, a space preferably exists between the end of the cylindrical opening and the top of the venturi port.

In further features of this invention, the air filter lower plate preferably curves upwardly to a central concave portion. The openings in the air filter lower plate are preferably formed in the uppermost portion of the concave lower plate. The downwardly extending tubes extend downwardly from this concave portion and towards the venturi ports.

One possible explanation for the unexpected increased air flow resulting from the openings, and the downwardly extending tubes, is provided since the air flow extending towards the venturi is directed by the cylindrical nozzles to minimize turbulent flow through the venturi.

The upwardly curved surface of the lower plate adds to this benefit by further providing guiding structure guiding the air flow to the openings in the lower plate. Further, the upwardly curved lower plate provides additional space between the top of the venturis in the carburetor, and the openings in the lower plate that allows the tubes to have a greater effect in conditioning and directing the flow of air through the venturis.

As described above, with this inventive structure, a very unexpected increase in the amount of air flow through the carburetor is achieved.

In a method according to the present invention, air is drawn through the venturi in the carburetor. At the same time, an air filter is placed on that carburetor with openings associated with each venturi. Air is drawn in through a filter media, through the inventive tapered tubes in the lower plate of the air filter, and then through the venturi in the carburetor.

These and other features of the present invention can best be understood from the following specifications and drawings, of which the following is a brief description:

DETAILED DESCRIPTION OF A PREFERRED EMBODIMENT

Figure 1:
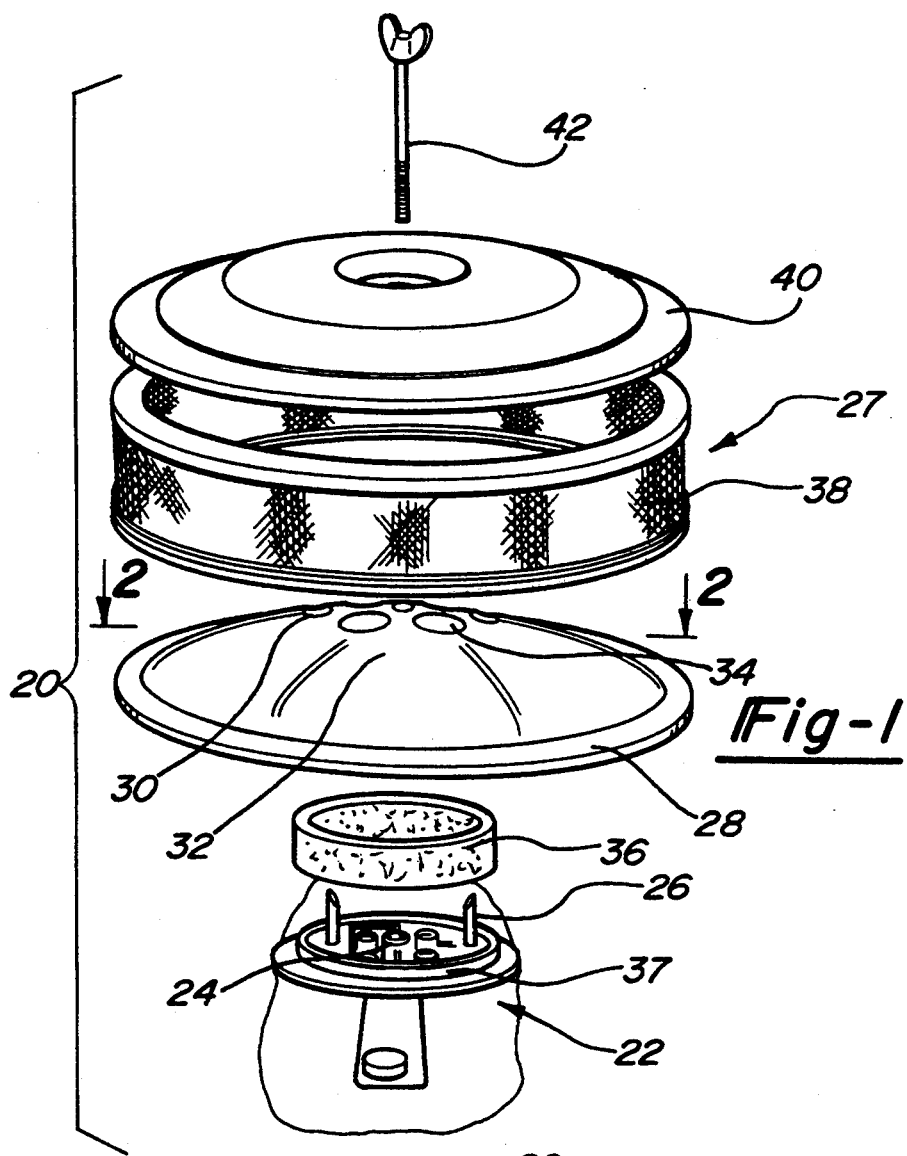
FIG. 1 is an assembly view of the inventive air filter associated with a known carburetor structure.

An inventive carburetor and air filter combination 20 is illustrated in FIG. 1. The carburetor 22 may be of a known type having a number of air injection venturi shown generally at 24. As will be explained below, venturi ports 24 draw air and fuel through the carburetor. Air vents 26 extend upwardly from the carburetor and into the air filter. Air vents 26 ensure that atmospheric pressure is maintained in the fuel bowls within the carburetor, such that the venturi ports are able to easily draw the fuel from the bowls.

Air filter structure 27 includes a lower plate 28, which includes two openings 30 associated with the vent tubes 26. Further, the surface 32 of the lower plate 28 curves upwardly to an uppermost central concave portion. Openings 34 are formed in this central uppermost portion, and are each associated with one of the venturis 24 in the carburetor 22. A gasket 36 is positioned around a circumferential, upstanding tubular portion 37 on the carburetor 22. A filter 38 is received between the lower plate 28 and an upper plate 40. A bolt 42 secures the filter portions 28, 38, 40 together.

Figure 2:
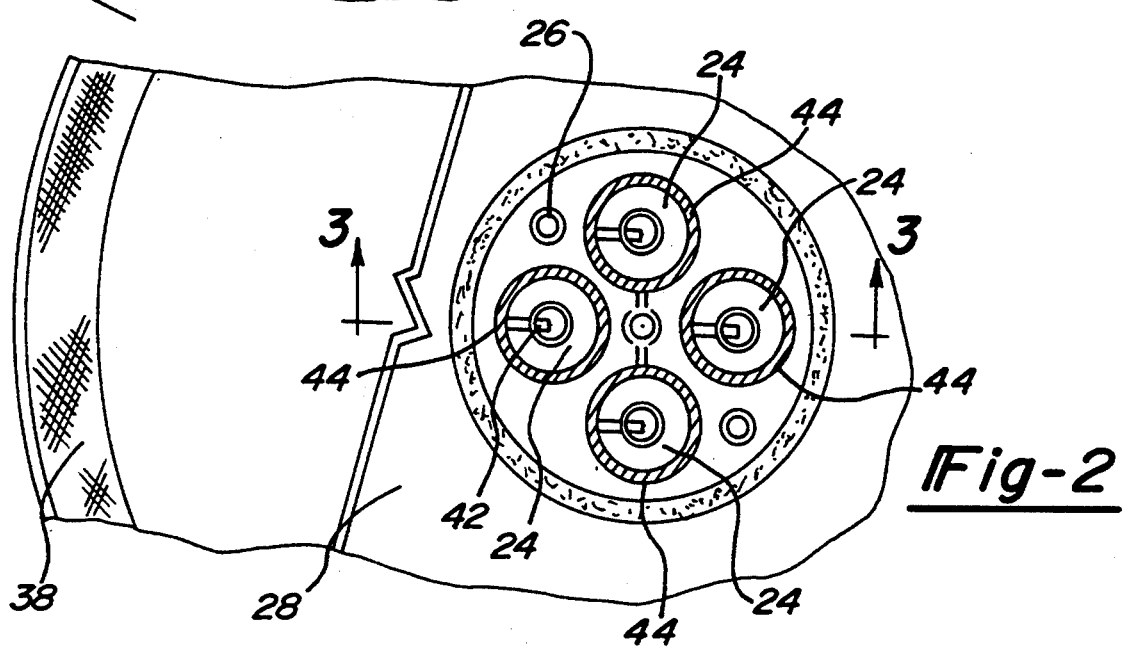
FIG. 2 is a cross-sectional view along line 2—2, as shown in FIG. 1.

As shown in FIG. 2, fuel discharge ports 42 are associated with each venturi 24. As is known, air is drawn from the air filter, and through venturi 24, drawing fuel from discharge jets 42 to mix with the air.

As explained above, the prior art air filters have restricted air flow to the carburetor by as much as twenty percent over the free air flow (flow without an air filter) that would reach the carburetor. The amount of air flowing through the carburetor directly affects the power and efficiency of the engine, and it would be desirable to increase that air flow.

The inventive openings 34 provide a sort of nozzle which increase the amount of air flow reaching the carburetor 22. Downwardly extending tubular members 44 extend from lower plate 28 towards the venturis 24.

Figure 3:
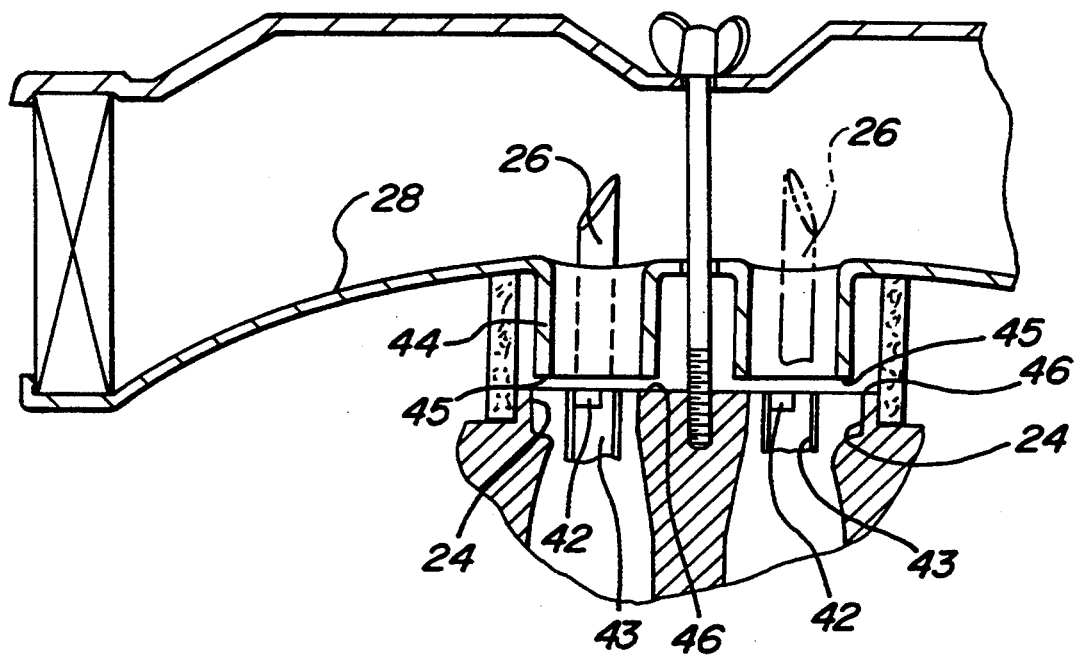
FIG. 3 is a cross-sectional view along line 3—3, as shown in FIG. 2.

As shown in FIG. 3, the downwardly extending tubular portions 44 extend towards each of the venturis 24. A central boost venturi 43 receives the discharge nozzle 42, as is known. Although one type of carburetor is shown, it should be understood that many variations of the basic structure exist. This invention is applicable to all such carburetors. The tubular portions 44 have a diameter which is greater than the diameter of the venturi is 43. Further, a lowermost end 45 of the tubular portions 44 is spaced away from an uppermost end 46 of the venturis 24.

When a vehicle incorporating the inventive air filter and carburetor combination 20 operates, air is drawn in through the filter media 38, through the openings 34, the tubular portions 44, and into the venturis 24. The air flow draws fuel in a manner which is known in the art.

It is believed that the benefits derived from the inventive structure are provided in large part by the "guiding" or direction of the air flow through the carburetor venturis 24. This guided flow will maximize the volume of air that can be drawn into the carburetor at any given period of time. The tubular portions 44 further facilitate this guiding of the flow. It is believed that space between the lowermost end 45 of tubular portions 44 and the uppermost end 46 of venturi ports 24 also provides increased air flow through the carburetor, by accelerating the air before it reaches the venturi 24 in the carburetor itself.

In addition, the lower plate 28 having the curved surface provides several valuable benefits. First, as can be understood from FIG. 3, the upward curve of the lower plate provides room for the tubular portions of 44 to extend towards the venturi 24. In addition, the upwardly curved surface of the lower plate also provides another "pre-plenum" or guide leading the air towards the openings 34.

The inventive use of the openings 34 guide or direct air in the proper direction such that it is flowing towards the venturi 24. A large increase in the amount of air flow to the carburetor 22 has been achieved. It has been found that the improvements to air flow from this inventive air filter is on the order of seven to eight percent when compared to free air flow. As has been explained above, prior art air filters typically impose a restriction to air flow more on the order of twenty percent. The inventive air filter thus provides valuable, unexpected benefits.

Although a preferred embodiment of this invention has been disclosed, a worker of ordinary skill in the art would recognize that certain modifications would come under the scope of this invention. For that reason, the following claims should be studied in order to determine the true scope and content of this invention.

I claim:

1. An air filter comprising a filter:
   a filter media;
   a top cover;
   a lower plate adapted to be placed on a carburetor, said lower plate having a plurality of openings adapted to be aligned with the venturis in a carburetor which is to receive said air filter; and
   said plurality of openings in said lower plate being cylindrical and including downwardly extending members extending from said lower plate toward the venturis of the carburetor on which said air filter is to be placed, but leaving a space between said downwardly extending members and the venturis.

2. An air filter as recited in claim 1, wherein said filter media is a generally cylindrical air filter member received between said lower plate and said top cover.

3. An air filter as recited in claim 1, wherein said downwardly extending members are generally cylindrical.

4. An air filter as recited in claim 1, wherein there are four of said openings.

5. An air filter as recited in claim 1, wherein said lower plate curves upwardly to a central concave portion.

6. An air filter as recited in claim 5, wherein downwardly extending members extend from a lower face of said lower plate, and the upwardly curved plate allows said downwardly extending members to extend toward the venturis in the carburetor which is to receive said air filter.

7. An air filter as recited in claim 5, wherein said plurality of openings are formed in a generally uppermost portion of said curved lower plate.

8. An air filter as recited in claim 7, wherein downwardly extending members extend from a lower face of said lower plate, and the upwardly curved plate allows said extending portions to extend toward the venturi ports in the carburetor which is to receive said air filter.

9. A vehicle carburetor comprising:
a carburetor member having a plurality of air intake ports with venturis;
an air filter received on said carburetor, said air filter having:
(i) a lower plate;
(ii) an upper cover;
(iii) a filter media positioned between said lower plate and said upper cover;
(iv) said lower plate including a plurality of cylindrical openings extending through said lower plate at locations associated with said venturi ports of said carburetor; and
said lower plate including a plurality of downwardly extending members extending from each of said pluralities of openings in said lower plate toward said venturis in said carburetor, a space existing between a lowermost end of each of said downwardly extending members and an upper end of each of said venturis.

10. A carburetor as recited in claim 9, wherein said carburetor has a pair of air vents extending upwardly past said venturi ports, said air vents extending through holes in said lower plate and into an internal portion of said air filter.

11. A vehicle carburetor as recited in claim 9, wherein said lower plate curves upwardly towards a central uppermost portion which is spaced away from said venturi ports.

12. A vehicle carburetor as recited in claim 11, wherein said plurality of cylindrical openings in said lower member are formed in said central uppermost portion of said upwardly curved surface.

13. A vehicle carburetor as recited in claim 9, wherein said lower plate curves upwardly towards a central uppermost portion which is spaced away from said venturi ports.

14. A vehicle carburetor as recited in claim 13, wherein said plurality of openings in said lower member are formed in said central uppermost portion of said upwardly curved surface.

15. A method of supplying air to a carburetor comprising the steps of:
(a) providing a plurality of venturis in a carburetor;
(b) providing an air filter on said carburetor, and providing said air filter with a plurality of openings aligned with said plurality of venturis in said carburetor;
(c) drawing air through said air filter and through said openings;
(d) drawing the air of step (c) into said venturis in said carburetor; and
(e) providing said filter with a lower plate provided with downwardly extending members extending from each of said pluralities of openings in said air filter, and said downwardly extending members being provided to extend to a location which is spaced from an uppermost end of said venturis.

16. A vehicle carburetor as recited in claim 15, wherein said lower plate curves upwardly towards a central portion which is spaced away from said venturis.

17. A vehicle carburetor comprising:
a carburetor member having a plurality of venturis;
an air filter received on said carburetor, said air filter having:
(i) a lower plate;
(ii) an upper plate;
(iii) a filter media positioned between said lower plate and said upper plate;
(iv) said lower plate including a plurality of openings extending through said lower plate at locations aligned with said venturi ports of said carburetor, and said lower plate curving upwardly toward a generally concave central portion, said openings being positioned in a generally uppermost portion of said plate, and generally tubular downwardly extending members extending from said lower plate and associated with each of said openings; and
(v) a lowermost end of said downwardly extending members being spaced from an uppermost end of an associated one of said venturis.

* * * * *